United States Patent
Yuzawa et al.

(10) Patent No.: US 8,043,473 B2
(45) Date of Patent: Oct. 25, 2011

(54) METHOD OF DEINKING RECOVERED PAPER

(75) Inventors: Chie Yuzawa, Tokyo (JP); Hisashi Iwabuchi, Tokyo (JP); Yasuyuki Kamijo, Tokyo (JP); Shisei Goto, Tokyo (JP); Takeshi Iimori, Tokyo (JP)

(73) Assignee: Nippon Paper Industries Co., Ltd., Tokyo (JP)

( * ) Notice: Subject to any disclaimer, the term of this patent is extended or adjusted under 35 U.S.C. 154(b) by 90 days.

(21) Appl. No.: 12/531,968

(22) PCT Filed: Mar. 21, 2008

(86) PCT No.: PCT/JP2008/055243
§ 371 (c)(1),
(2), (4) Date: Sep. 18, 2009

(87) PCT Pub. No.: WO2008/123130
PCT Pub. Date: Oct. 16, 2008

(65) Prior Publication Data
US 2010/0206498 A1    Aug. 19, 2010

(30) Foreign Application Priority Data
Mar. 20, 2007 (JP) ................................. 2007-073497

(51) Int. Cl.
*D21B 1/32* (2006.01)

(52) U.S. Cl. ..................... 162/4; 162/5; 162/8; 162/189
(58) Field of Classification Search .................. 162/4, 5, 162/8, 199, 189; 423/332; 502/243; 510/507, 510/511
See application file for complete search history.

(56) References Cited

U.S. PATENT DOCUMENTS

| | | | | |
|---|---|---|---|---|
| 5,389,200 A | * | 2/1995 | Cody et al. | 162/5 |
| 5,725,730 A | * | 3/1998 | Smolka et al. | 162/5 |
| 6,210,526 B1 | * | 4/2001 | Pohlen | 162/4 |

FOREIGN PATENT DOCUMENTS

| | | |
|---|---|---|
| JP | 61-266688 | 11/1986 |
| JP | 11-200269 | 7/1999 |
| JP | 3260211 | 12/2001 |
| JP | 2004-084088 | 3/2004 |
| JP | 2007-021485 | 2/2007 |

OTHER PUBLICATIONS

JPO machine translation of JP 07-018593, Jan. 20, 1995.*
JPO machine translation of JP 2004-084088, Mar. 18, 2004.*
JPO machine translation of JP 2007-021485, Feb. 1, 2007.*
International Search Report for PCT/JP2008/055243, mailed Jun. 10, 2008.
Kanazawa, "Neutral Deinking Technology Benefit & Problems Solution of the Problems by Micro-Floatation, Etc.", Aikawa Iron Works Co., Ltd., Tappi Journal vol. 49, pp. 121-130, Jan. 1995.

* cited by examiner

*Primary Examiner* — Eric Hug
*Assistant Examiner* — Peter Chin
(74) *Attorney, Agent, or Firm* — Nixon & Vanderhye P.C.

(57) ABSTRACT

The object of the present invention is to provide a process for producing deinked pulp from recovered paper containing stickies while preventing excessive reduction in the size of stickies, lowering the COD of effluents, and producing deinked pulp with a smaller residual ink content.
In the ink detachment stage of the process for producing deinked pulp from recovered paper containing stickies, an anhydride of crystalline layered silicate is added, preferably in an amount of 0.1-1.5 weight % of absolute-dry pulp, and a deinking treatment is performed at a pH of 7.0-9.9. In the present invention, the deinking treatment is performed in a weakly alkaline to neutral region which is generally said to be effective in reducing the amount of stickies but less effective in ink detachment and, yet, deinked pulp having a smaller amount of residual ink can be produced.

3 Claims, No Drawings

METHOD OF DEINKING RECOVERED PAPER

This application is the U.S. national phase of International Application No. PCT/JP2008/055243, filed 21 Mar. 2008, which designated the U.S. and claims priority to Japanese Application No. 2007-073497, filed 20 Mar. 2007, the entire contents of each of which are hereby incorporated by reference.

TECHNICAL FIELD

The present invention relates to a method of producing deinked pulp from recovered paper.

BACKGROUND ART

In response to the recent concern for saving resources or protecting the global environment, recycling of waste paper (old paper) is a social issue and the papermaking industry considers it extremely important to perform enhanced processing of waste paper and expand the use of the recycled paper. In one way to meet this need, the printing ink on the recovered paper is removed by the deinking process to make pulp with a smaller content of residual ink, which is optionally mixed with virgin pulp to make fresh paper.

However, the making of deinked pulp involves one problem with the pulping treatment and the ink detaching treatment; since high shear force is commonly applied under a highly alkaline condition with a pH exceeding 10, the contaminants in the waste paper such as a pressure-sensitive adhesive, a bonding agent, adhesive tape, spine glue on magazines, and vinyl tape become so small in size that it is very difficult to remove them completely even if the deinked pulp is subjected to the subsequent fine screening process as by a screen or a cleaner. If the deinked pulp contains such micronized contaminant, papermaking from that deinked pulp will suffer, for example, a runability problems such as sheet breaks or a deterioration in paper quality due to contamination of the paper with the sticky contaminants. The exertion of high shear force under the alkaline condition causes other difficulties, such as an increased chemical oxygen demand (COD) in the effluent, damaged pulp fibers that have a lower water freeness which results in less efficient paper machine runability, and the formation of pulp that has lower bulk and which is poor in optical characteristics.

Japan TAPPI Journal vol. 49(1), 121-130 (Non-Patent Document 1) proposes a method in which recovered paper is pulped at low temperature under a neutral condition to prevent stickies from becoming undesirably small in size and, after removing the stickies with a screen or by other suitable means as it remains large enough, ink is detached under a highly alkaline condition. This method is anticipated to provide some improvement as regards the stickies but, on the other hand, since the pulp is subjected to high shear force under the highly alkaline condition, there is no anticipation for lower COD.

To deal with these problems, a method has been proposed in which the use of alkali chemicals in the making of deinked pulp (DIP) is sufficiently reduced to establish a neutral condition, whereby the stickies present in waste paper are prevented from becoming unduly small in size and, what is more, the COD in the effluent is reduced. However, the reduced use of alkali chemicals lowers the detachability of ink, eventually deteriorating the quality of the pulp as the final product. To cope with this problem, the official gazette of JP 11-200269 A (Patent Document 1) proposes a method in which recovered paper swelled under an alkaline condition is neutralized with an added acid and after neutralization or simultaneously with it, high shear force is applied, whereby DIP with a smaller content of residual ink is produced while reducing the COD of effluents from the DIP production process. However, the use of an acid to neutralize the alkali-swelled waste paper adds to the overall cost.

The official gazette of U.S. Pat. No. 3,260,211 (Patent Document 2) shows a crystalline silicate having a deinking capability. However, this document does not show using the silicate in a weakly alkaline to neutral region, or a condition where deinking is generally difficult to perform.

Patent Document 1: Official gazette of JP 11-200269 A
Patent Document 2: Official gazette of U.S. Pat. No. 3,260, 211
Non-Patent Document 1: Japan TAPPI Journal vol. 49(1), 121-130

DISCLOSURE OF THE INVENTION

Problems to be Solved by the Invention

An object of the present invention is to provide a process for making deinked pulp, which is characterized by performing an ink detachment treatment in a weakly alkaline to neutral region so as to prevent excessive reduction in the size of stickies, to lower the COD of effluents, and to produce deinked pulp with a smaller residual ink content.

Means for Solving the Problems

To attain the above-mentioned object, the present inventors made an intensive study on a process for making deinked pulp from recovered paper in a weakly alkaline to neutral region. As a result, the inventors have found that the stated object can be effectively attained by adding an anhydride of crystalline layered silicate in the ink detachment stage to detach the ink from the pulp at a pH of 7.0-9.9.

Advantages of the Invention

Using the anhydride of crystalline layered silicate in the ink detachment stage offers such an advantage that even if the deinking treatment is performed in a weakly alkaline to neutral region which realizes less effective ink detachment than the conventionally employed highly alkaline region with pHs in excess of 10, deinked pulp having a smaller content of residual ink can be produced. What is more, the deinking treatment in a weakly alkaline to neutral region prevents stickies from being rendered into excessively fine particles so that the efficiency of removing the stickies in the subsequent screening stage can be improved and, at the same time, the COD of effluents can be lowered.

BEST MODE FOR CARRYING OUT THE INVENTION

Waste paper from which deinked pulp is made by the process of the present invention may derive from newspaper, inserts, magazines, books, office paper, as well as printed paper generated from copiers and OA equipment. In particular, magazine's waste paper having stickies such as pressure-sensitive adhesives, bonding agents, adhesive tape, and spine glue on magazines can also be used as the material from which to make deinked pulp by the process of the present invention.

Common steps in the making of deinked pulp are: a pulping treatment (disintegrating treatment) in which an alkali chemical and a surfactant are added to disintegrate the recovered paper; an ink detaching treatment in which ink is detached from the pulp by mechanical shearing under alkaline conditions; a flotation treatment and/or a washing treatment for removing the ink separated from the pulp; an alkali soaking treatment in which the pulp is dehydrated, commonly to a consistency of 10-35 weight % and, thereafter, an alkali chemical, hydrogen peroxide and/or a surfactant are added to detach more ink from the pulp; and another flotation treatment and/or washing treatment. Thereafter, a screening stage (contaminant removing stage) is performed to remove any undesired contaminant.

In the present invention, it is essential to add the crystalline layered silicate in anhydride form in the ink detachment stage. The "ink detachment stage" in the present invention is a stage of detaching ink from pulp fibers by applying mechanical shear; specifically, this consists of the above-described pulping treatment, alkali soaking treatment (also called "swelling treatment"), and ink detaching treatment by mechanical shear. The crystalline layered silicate may be added in any of these treatments.

In the present invention, the addition of an alkali chemical is suppressed such that ink detachment is performed in a weakly alkaline to neutral region at pHs of 7.0-9.9, preferably 7.0-9.5. At pHs lower than 7.0, the disintegrability and ink detachability of recovered paper deteriorate considerably, which is by no means desirable. At pHs in excess of 9.9, the alkalinity of the recovered paper being pulped increases so much as to promote the formation of undesirably tiny stickies and cause a marked increase in the COD of effluents, which is not preferred, either.

In the pulping treatment to be performed in the present invention, any type of pulpers may be used, a high-consistency pulper, a low-consistency pulper or a drum pulper, but it is preferred to perform the pulping treatment using a high-consistency pulper. The temperature for the pulping treatment is preferably 60° C. or below, more preferably 50° C. or below, but it is by no means limited to these values.

In the ink detaching treatment by mechanical shear, any type of machines may be used, a kneader, a disperser, or a refiner.

The anhydride of crystalline layered silicate to be used in the present invention is preferably represented by such general formulae as $Na_2O.2SiO_2$ and $K_2O.2SiO_2$, but it is by no means limited to these formulae. Silicates (e.g. water glass) which are commonly used for ink detachment are in the non-crystalline state and do not have a crystalline structure in finite form. In contrast, the anhydride of crystalline layered silicate to be used in the present invention has a structure represented by Chemical Formula 1 indicated below; the basic structure of its molecule consists of a silicate layer ($SiO_4$), surrounded with sodium or calcium ions; a plurality of such layers in plate form are stacked to make a layered, δ-type crystalline structure. The thus characterized crystalline layered silicate has a far greater ability to trap metal ions than other types of crystalline silicates have.

[Chemical Formula 1]

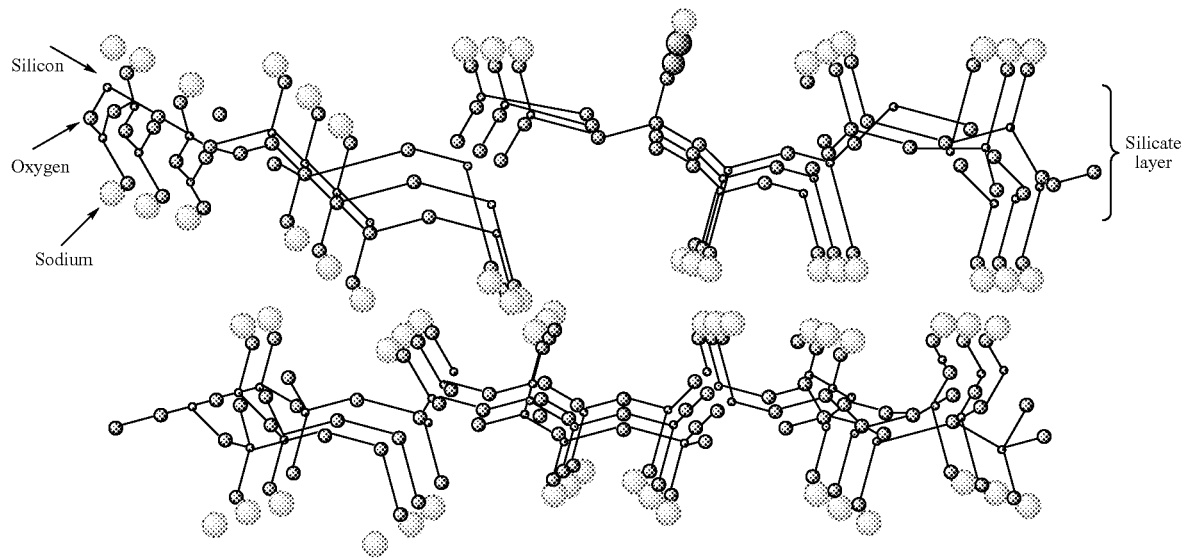

The anhydride of crystalline layered silicate to be used in the present invention is preferably added either in a solid state or in suspension, but it is not necessarily limited to these states.

The particle size of the anhydride is preferably not more than 600 μm, but it is not necessarily limited to this value. More preferred to use is the anhydride with particle sizes of not less than 60 μm but not more than 100 μm.

The anhydride of crystalline layered silicate to be used in the present invention is preferably added in an amount ranging from 0.1 to 1.5 weight %, more preferably from 0.1 to 1.0 weight %, of the absolute-dry pulp weight. By adding at least 0.1 weight % of the anhydride, the disintegrability and ink detachability of the recovered paper can be rendered even better. By ensuring that the anhydride is not added in an amount greater than 1.5 weight %, the alkalinity of the recovered paper being pulped can be prevented from becoming unduly strong, whereby the formation of undesirably tiny stickies and a marked increase in the COD of effluents can be suppressed.

The alkali chemical to be used in combination with the anhydride of crystalline layered silicate may be at least one member of the group consisting of sodium hydroxide, potassium hydroxide, sodium silicate, and sodium carbonate. The deinking agent to be used in the present invention may be of any type and, more preferably, it is selected from among higher alcoholic deinking agents, namely, those surfactants which comprise a long-chain alkyl group and polyethylene oxide and/or polypropylene oxide as principal components.

After the pulping treatment or the ink detaching treatment ends, a flotation aid such as a deinking agent, a bleaching agent, a chelating agent and a flocculant may optionally be added to perform a flotation treatment or a washing treatment. Subsequently, a stage may also be performed to remove contaminant. In these instances, no high shear force is exerted on the fibers or the stickies, so the pH condition may remain neutral or it may be rendered alkaline. Note, however, that the treatments are desirably performed under neutral conditions to enhance the COD reducing effect since the pulp fibers are under the alkaline conditions only for a short period. The contaminant removing stage may be performed after the pulping treatment and/or after the ink detaching treatment.

The deinked pulp made by the process of the present invention has the content of stickies sufficiently reduced that in the process of making paper that contains it, the occurrence of imperfections such as sheet breaks due to the stickies is suppressed and the frequency of operational troubles is sufficiently reduced to ensure consistent production. In addition, the paper containing the deinked pulp of the present invention has only little dirt (black specks and like contaminants) on its surface and features high product quality. In the process of the present invention for making deinked pulp, the swelling of or damage to the pulp fibers is sufficiently suppressed that there will be no drop in the water freeness or strength of the fibers, thus yielding paper that is satisfactory in bulk, opacity and stiffness and which has superior printability.

The paper containing the deinked pulp of the present invention can be used as various kinds of paper such as printing paper, information recording paper, converting paper, and sanitary paper. It can also be used as base paper for various kinds of paper having a pigment-containing coating layer such as coated paper, information recording paper, and converting paper.

Effect

Using the anhydride of crystalline layered silicate offers another advantage in that deinked pulp with a smaller amount of ink left undetached can be produced even if the deinking treatment is performed in a weakly alkaline to neutral region. The reasons would include the abrasive effect on ink of using the crystalline layered silicate and the promoted ink detachment due to a local pH increase that occurs when the surfaces of the crystalline layered silicate particles dissolve.

EXAMPLES

On the following pages, the present invention is shown more specifically by reference to examples but it should be understood that the present invention is by no means limited to those examples. The deinked pulp samples obtained in the Examples and Comparative Examples were evaluated by performing the measurements described below.

<Measurement of Residual Ink>

Using a 150-mesh (0.1 mm$^\Phi$) screen, the free ink in the pulp was washed off until a clear filtrate formed; thereafter, a handsheet was prepared in accordance with JIS P 8222 and measured for the percent area of the residual ink on the sheet surface using a Spec Scan 2000 (a contaminant counting apparatus of Apogee Technology, Inc.)

<Measurement of COD>

The filtrate of the deinked pulp slurry as sampled at the outlet of a disperser was measured for COD in accordance with JIS K 0102 and the result was expressed as COD per absolute-dry pulp weight (COD (kg)/absolute-dry pulp weight (t)).

<Number and Area of Stickies>

The number and area of stickies were measured in accordance with the following stickies measuring method disclosed in Japanese Patent Application No. 2006-95937.

Low-consistency slurry was prepared from the deinked pulp with an absolute-dry weight of 1 kg and passed through a flat test screen having a slot width of 0.15 mm to separate contaminants. The contaminants were then filtered through a glass fiber made filter medium (hereinafter abbreviated as A) and the remaining contaminants on the filter medium were dried; then, a cellulosic filter medium (hereinafter abbreviated as B) was placed over the filter medium A, with the contaminants held between the two mediums A and B; the assembly was heated to 105° C. and immediately pressed at 3.5 kg/cm$^2$ for 5 minutes. Subsequently, the two mediums A and B were detached from each other, and the stickies adhering to medium A (less sticky contaminants (sticky foreign matter)) and those adhering to medium B (more sticky contaminants) were stained with an ethanol solution of 0.01% Oil Blue N. After the staining, the sample was washed in a mixed solution (water/ethanol=50/50) for 5 minutes. Washing was done twice. After drying the sample, a sticky-counting apparatus (Spec Scan 2000 of Apogee Technology, Inc.) was used to measure the number and area of the stickies adhering to the mediums A and B.

Example 1

The following experiment was conducted using a pulper with a capacity of 2 L which was equipped with agitating blades capable of free rpm adjustment. The pulper was supplied with printed old paper consisting of 80 weight % old newspaper and 20 weight % old magazine paper. Clear water and chemicals were also added to give a pulp consistency of 15 weight %. The chemicals added were 0.3% sodium hydroxide, 0.1% anhydride of crystalline layered silicate (Trade name: PURIFEED; product of Tokuyama Siltech CO., LTD.), and 0.2% higher alcohol surfactant (deinking agent) (Trade name: DI-7027; product of Kao Corporation), all percentages being based on the weight of the old paper. With the temperature held at 40-50° C., pulping was effected at 400 rpm for 15 minutes. By subsequent passage through a coarse screen, floatation, a fine screen and a disperser, deinked pulp was made. The resulting deinked pulp was washed by passage through a 150-mesh (0.1 mm$^\Phi$) screen until a clear filtrate formed. The results of residual ink and COD measurements are shown in Table 1.

Example 2

The procedure of Example 1 was repeated, except that sodium hydroxide, the anhydride of crystalline layered silicate and the higher alcohol surfactant (Trade name: DI-7027; product of Kao Corporation) were added as chemicals in the respective proportions of 0.3%, 0.3% and 0.2% based on the weight of the old paper. The results are shown in Table 1.

Example 3

The procedure of Example 1 was repeated, except that sodium hydroxide, the anhydride of crystalline layered silicate and the higher alcohol surfactant (Trade name: DI-7027; product of Kao Corporation) were added as chemicals in the respective proportions of 0.3%, 0.5% and 0.2% based on the weight of the old paper. The results are shown in Table 1.

Comparative Example 1

The procedure of Example 1 was repeated, except that sodium hydroxide, sodium silicate No. 3 (as pure substance) and the higher alcohol surfactant (Trade name: DI-7027; product of Kao Corporation) were added as chemicals in the respective proportions of 1.0%, 1.0% and 0.2% based on the weight of the old paper. The results are shown in Table 1.

Comparative Example 2

The procedure of Example 1 was repeated, except that sodium hydroxide and the higher alcohol surfactant (Trade name: DI-7027; product of Kao Corporation) were added as chemicals in the respective proportions of 1.0% and 0.2% based on the weight of the old paper. The results are shown in Table 1.

Comparative Example 3

The procedure of Example 1 was repeated, except that sodium hydroxide and the higher alcohol surfactant (Trade name: DI-7027; product of Kao Corporation) were added as chemicals in the respective proportions of 0.1% and 0.2% based on the weight of the old paper. The results are shown in Table 1.

Comparative Example 4

The procedure of Example 1 was repeated, except that sodium hydroxide and the higher alcohol surfactant (Trade name: DI-7027; product of Kao Corporation) were added as chemicals in the respective proportions of 0.3% and 0.2% based on the weight of the old paper. The results are shown in Table 1.

Comparative Example 5

The procedure of Example 1 was repeated, except that sodium hydroxide and the higher alcohol surfactant (Trade name: DI-7027; product of Kao Corporation) were added as chemicals in the respective proportions of 0.3% and 0.25% based on the weight of the old paper. The results are shown in Table 1.

Comparative Example 6

The procedure of Example 1 was repeated, except that sodium hydroxide and the higher alcohol surfactant (Trade name: DI-7027; product of Kao Corporation) were added as chemicals, each in a proportion of 0.3%, based on the weight of the old paper. The results are shown in Table 1.

TABLE 1

| | pH | Residual ink (%) |
|---|---|---|
| Example 1 | 8.7 | 0.33 |
| Example 2 | 9.2 | 0.30 |
| Example 3 | 9.4 | 0.28 |
| Comparative Example 1 | 10.6 | 0.32 |
| Comparative Example 2 | 11.1 | 0.27 |
| Comparative Example 3 | 7.3 | 0.41 |

TABLE 1-continued

| | pH | Residual ink (%) |
|---|---|---|
| Comparative Example 4 | 8.8 | 0.39 |
| Comparative Example 5 | 8.8 | 0.39 |
| Comparative Example 6 | 8.5 | 0.38 |

As Table 1 shows, the ink detachability obtained in Examples 1 to 3 was almost comparable to the levels obtained in Comparative Examples 1 and 2 where pulping was effected under highly alkaline conditions in excess of pH 10; it was higher than the levels obtained in Comparative Examples 3 to 6 where the pulping treatment was performed at pHs of 7.0-9.9.

Example 4

The following experiment was conducted using a pulper with a capacity of 5 $m^3$ which was equipped with agitating blades capable of free rpm adjustment. The pulper was supplied with printed old paper consisting of 100 parts by weight of old newspaper and 0.1 part by weight of adhesive tape. Clear water and chemicals were also added to give a pulp consistency of 15 weight %. The chemicals added were 0.3% sodium hydroxide, 0.5% anhydride of crystalline layered silicate (Trade name: PURIFEED; product of Tokuyama Siltech CO., LTD.), and 0.2% higher alcohol surfactant (Trade name: DI-7027; product of Kao Corporation), all percentages being based on the weight of the old paper. With the temperature held at 40-50° C., pulping was effected at 265 rpm for 15 minutes. By subsequent passage through a coarse screen, floatation, a fine screen and a disperser, deinked pulp was made. The resulting deinked pulp was washed by passage through a 150-mesh (0.1 $mm^\Phi$) screen until a clear filtrate formed. The residual ink, COD, as well as the number and area of stickies were measured. The results are shown in Table 2.

Comparative Example 7

The procedure of Example 4 was repeated, except that sodium hydroxide, sodium silicate (as pure substance) and the higher alcohol surfactant (Trade name: DI-7027; product of Kao Corporation) were added as chemicals in the respective proportions of 1.0%, 1.0% and 0.2% based on the weight of the old paper. The results are shown in Table 2.

Comparative Example 8

The procedure of Example 4 was repeated, except that sodium hydroxide, sodium silicate (as pure substance), the higher alcohol surfactant (Trade name: DI-7027; product of Kao Corporation), and a fatty acid based surfactant (deinking agent) (Trade name: DI-260; product of Kao Corporation) were added as chemicals in the respective proportions of 0.2%, 0.15%, 0.15% and 0.2% based on the weight of the old paper. The results are shown in Table 2.

Comparative Example 9

The procedure of Example 4 was repeated, except that sodium hydroxide, sodium silicate (as pure substance), the higher alcohol surfactant (Trade name: DI-7027; product of Kao Corporation), and a fatty acid based surfactant (Trade name: DI-260; product of Kao Corporation) were added as chemicals in the respective proportions of 0.2%, 0.15%, 0.3% and 0.2% based on the weight of the old paper. The results are shown in Table 2.

TABLE 2

|  | pH | Residual ink % | COD kg/t | Number of stickies stickies/kg | Area of stickies mm²/kg |
|---|---|---|---|---|---|
| Example 4 | 9.3 | 0.30 | 7.0 | 80 | 8.6 |
| Comparative Example 7 | 11.3 | 0.27 | 9.1 | 202 | 27.9 |
| Comparative Example 8 | 8.8 | 0.35 | 4.8 | 184 | 22.2 |
| Comparative Example 9 | 9.1 | 0.36 | 6.3 | 340 | 39.1 |

As Table 2 shows, the amount of residual ink in Example 4 was comparable to the result of Comparative Example 7 where the treatment was conducted under the commonly used, highly alkaline condition; on the other hand, Example 4 gave a lower COD level. Example 4 also gave a fewer stickies that covered a smaller area than in Comparative Example 7. In Comparative Examples 8 and 9 which did not use the anhydride of a crystalline layered silicate, the amount of residual ink was greater and more stickies were present to cover a larger area than in Example 4.

Example 5

The high-consistency pulper (product of AIKAWA Iron Works) in the deinked pulp making stage at Mill A of Nippon Paper Group, Inc. was charged with old paper consisting of 37.5 weight % old newspaper and 62.5 weight % old magazine paper. Chemicals were also added to give a pulp consistency of 15 weight % and a pulping treatment was performed. The chemicals added were 0.2% sodium hydroxide, 0.3% anhydride of crystalline layered silicate (Trade name: PURI-FEED; product of Tokuyama Siltech CO., LTD.), and higher alcohol surfactant (Trade name: DI-7027; product of Kao Corporation), all percentages being based on the weight of the old paper. By subsequent passage through a coarse screen, floatation, a fine screen and a disperser, deinked pulp was made. The deinked pulp as completed was measured for the amount of residual ink, brightness, the amount of stickies, thickness, density and Taber stiffness by the methods described below. In addition, the filtrate of the deinked pulp slurry as sampled at the outlet of the disperser was measured for COD and the amount of micro stickies. The results are shown in Table 3.

<Measurement of Brightness>

The resulting deinked pulp was used to prepare a handsheet in accordance with JIS P 8222, and its ISO brightness was measured in accordance with JIS P 8148:2001.

<Measurement of Thickness, Basis Weight, and Density>

The handsheet prepared in accordance with JIS P 8222 was measured for its thickness in accordance with JIS P 8118:1998. The basis weight of the paper was also measured in accordance with JIS P 8124:1998 (ISO 536:1995). The density of the handsheet was calculated from the measured values of its thickness and basis weight.

<Measurement of Taber Stiffness>

The handsheet prepared in accordance with JIS P 8222 was measured for its stiffness in accordance with JIS P 8125:1976 (ISO 2493:1992) and corrected by the basis weight.

<Measurement of Micro Stickies>

The filtrate of the deinked pulp slurry as sampled at the outlet of the disperser was passed through two filters with respective sizes of 25 $\mu m^\Phi$ and 0.45 $\mu m^\Phi$, and the total organic carbon (TOC) in the filtrate was measured in accordance with JIS K 0101:1998. The amount of TOC contained in the range from 25 $\mu m^\Phi$ to 0.45 $\mu m^\Phi$ was used as an index for the micro stickies.

Comparative Example 10

The procedure of Example 5 was repeated, except that the chemicals added to the high-consistency pulper were 0.6% sodium hydroxide, 0.5% sodium silicate No. 3 (as pure substance), 0.2% hydrogen peroxide, and 0.12% higher alcohol surfactant, all percentages being based on the weight of the old paper. The results are shown in Table 3.

TABLE 3

|  | Example 5 | Comparative Example 10 |
|---|---|---|
| pH of pulper | 9.4 | 11.1 |
| Amount of residual ink % | 0.06 | 0.09 |
| Area of sticikes mm²/kg | 9.9 | 120.0 |
| Amount of micro sticikes kg/t | 3.8 | 4.6 |
| COD kg/t | 3.8 | 4.6 |
| ISO brightness % | 58.7 | 61.1 |
| Basis weight g/m² | 66.2 | 66.1 |
| Thickness μm | 124.3 | 117.1 |
| Density g/cm³ | 0.53 | 0.56 |
| Taber stiffness mN/(g/m²) | 0.89 | 0.81 |

As Table 3 shows, the amount of residual ink in Example 5 was comparable to the result of Comparative Example 10; on the other hand, Example 5 gave a lower COD level. Example 5 also gave a smaller area of stickies than Comparative Example 10, suggesting an improvement in the efficiency of removing the stickies through the screens. The paper made in Example 5 had a lower density, was more bulky, and featured better stiffness.

Example 6

The high-consistency pulper (product of AIKAWA Iron Works) in the deinked pulp making stage at Mill A of Nippon Paper Group, Inc. was charged with old paper consisting of 75 weight % old newspaper and 25 weight % old magazine paper. Chemicals were also added to give a pulp consistency of 15 weight % and a pulping treatment was performed. The chemicals added were 0.2% sodium hydroxide, 0.3% anhydride of crystalline layered silicate (Trade name: PURI-FEED; product of Tokuyama Siltech CO., LTD.), and 0.13% higher alcohol surfactant, all percentages being based on the weight of the old paper. By subsequent passage through a coarse screen, floatation, a fine screen and a disperser, deinked pulp was made. The deinked pulp as completed was measured for the amount of residual ink, brightness, the amount of stickies, thickness, density and Taber stiffness by the methods described below. In addition, the filtrate of the deinked pulp slurry as sampled at the outlet of the disperser was measured for COD and the amount of micro stickies. The results are shown in Table 4.

Comparative Example 11

The procedure of Example 6 was repeated, except that the chemicals added to the high-consistency pulper were 0.55% sodium hydroxide, 0.5% sodium silicate No. 3 (as pure substance), and 0.12% non-ionic surfactant (deinking agent), all percentages being based on the weight of the old paper. The results are shown in Table 4.

TABLE 4

|  | Example 6 | Comparative Example 11 |
|---|---|---|
| pH of pulper | 9.1 | 9.1 |
| Amount of residual ink % | 0.04 | 0.04 |
| Area of sticikes mm²/kg | 31.9 | 90.1 |
| Amount of micro sticikes kg/t | 2.5 | 2.0 |
| COD kg/t | 3.3 | 4.4 |
| ISO brightness % | 57.5 | 59.4 |
| Basis weight g/m² | 61.8 | 63.4 |
| Thickness μm | 111.5 | 106.2 |
| Density g/cm³ | 0.55 | 0.60 |
| Taber stiffness mN/(g/m²) | 0.74 | 0.80 |

As Table 4 shows, the amount of residual ink in Example 6 was comparable to the result of Comparative Example 11; on the other hand, Example 6 gave a lower COD level. Example 6 also gave a smaller area of stickies than Comparative Example 11, suggesting an improvement in the efficiency of removing the stickies through the screens. The paper made in Example 6 had a lower density and was more bulky.

The invention claimed is:

1. A process for making deinked pulp from recovered paper, which comprises adding an anhydride of crystalline layered silicate in the ink detachment stage to detach the ink from the pulp by mechanical shear at a pH of 7.0-9.9.

2. The process according to claim 1, wherein the anhydride of crystalline layered silicate is added in an amount of 0.1-1.5 weight % based on absolute-dry pulp.

3. The process according to claim 1, wherein the recovered paper as the starting material contains stickier.

* * * * *